United States Patent [19]
Fletcher et al.

[11] 3,922,930
[45] Dec. 2, 1975

[54] REMOTELY OPERABLE ARTICULATED MANIPULATOR

[76] Inventors: James C. Fletcher, Administrator of the National Aeronautics and Space Administration, with respect to an invention of Ray E. Marlow, Wellsboro, Pa.

[22] Filed: Dec. 23, 1974

[21] Appl. No.: 535,410

[52] U.S. Cl.................. 74/665 B; 74/384; 214/1 R
[51] Int. Cl.².. F16H 37/06; F16H 35/00; B25J 3/00
[58] Field of Search...... 74/665 B, 665 C, 416, 417, 74/384, 385, 52, 1 R; 29/270; 214/1 B, 18 N

[56] References Cited
UNITED STATES PATENTS

| | | | |
|---|---|---|---|
| 3,460,610 | 8/1969 | Baker | 74/665 B |
| 3,478,620 | 11/1969 | Shimanckas | 74/417 X |
| 3,597,989 | 8/1971 | Benson | 74/384 X |
| 3,822,025 | 7/1974 | Loos | 214/1 BE |

*Primary Examiner*—Leonard H. Gerin
*Attorney, Agent, or Firm*—Wayland H. Riggins; L. D. Wofford, Jr.; John R. Manning

[57] ABSTRACT

An improved, remotely operable, articulated manipulator including a plurality of serially connected drive shafts, a grasping device mounted at the distal end of the ultimate drive shaft of a plurality of drive shafts, a plurality of joints including meshed bevel gears interconnecting the drive shafts, whereby rotary motion is imparted to the grasping device in response to rotation imparted to said drive shafts, a plurality of drive tubes concentrically related to the drive shafts for imparting angular displacement to the drive shafts about axes normally related to the longitudinal axes thereof, and a differential including a multiplicity of driver inputs for selectively rotating the drive shafts and drive tubes about their longitudinal axis.

8 Claims, 6 Drawing Figures

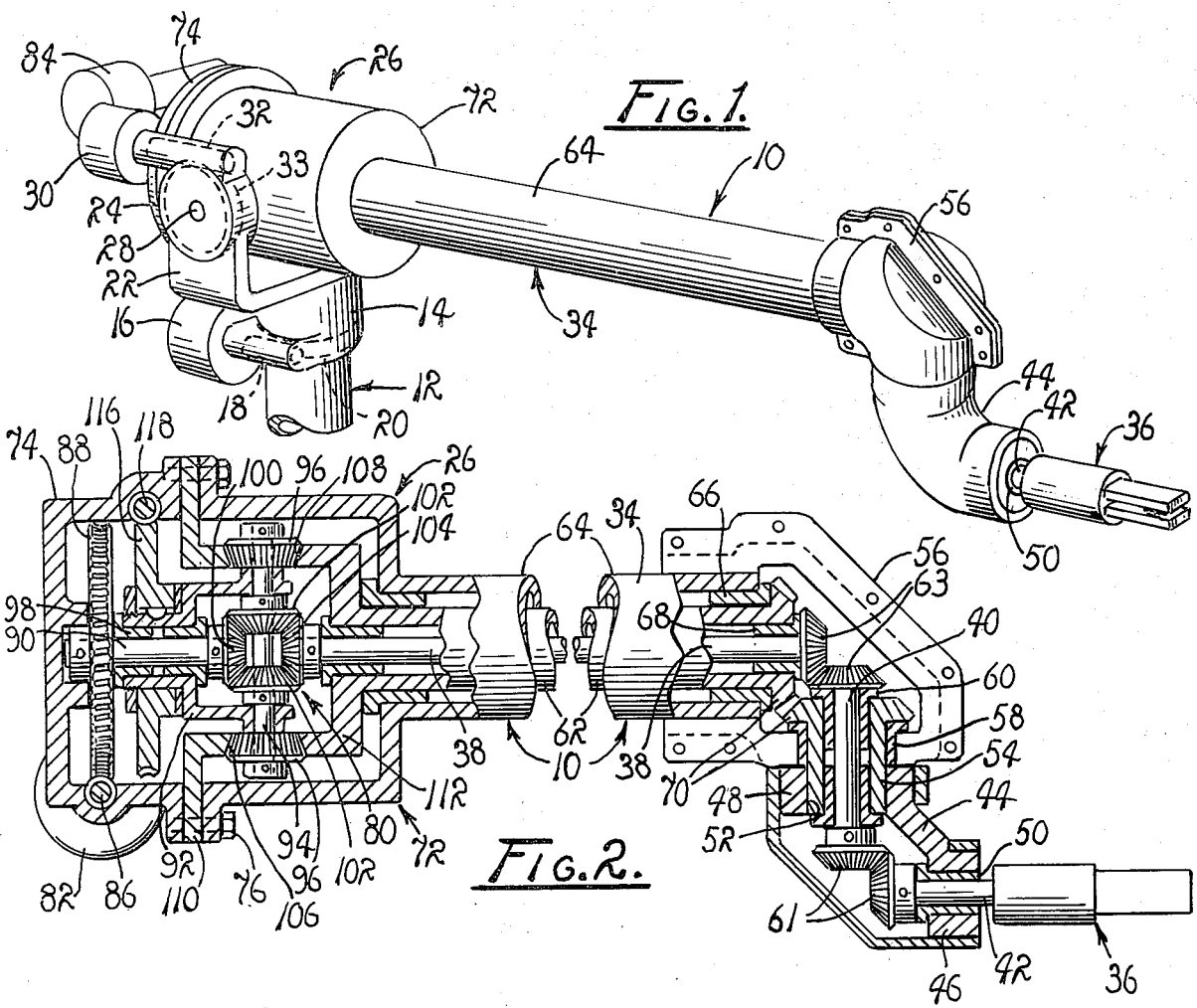
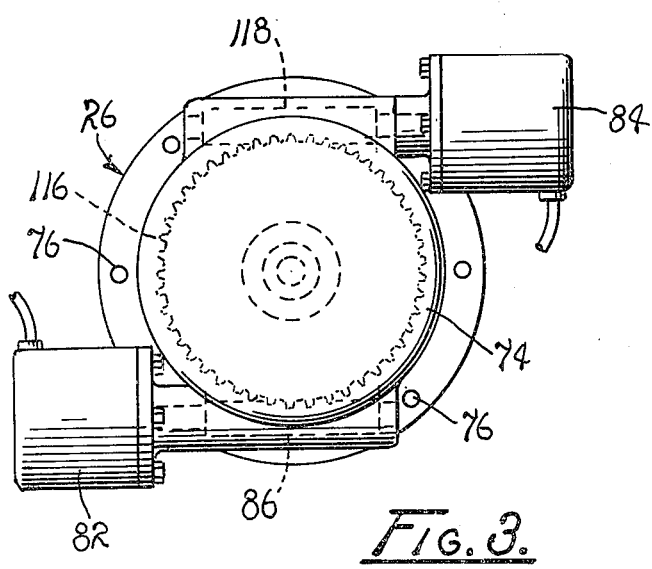

REMOTELY OPERABLE ARTICULATED MANIPULATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention generally relates to remote manipulators and more particularly to an improved remotely operable, articulated manipulator including a pivotal arm having at least one joint for interconnecting arm segments and comprising concentrically related drive shafts and drive tubes.

Remote manipulators are, of course, notoriously old and have utility in numerous fields of technology, including aerospace, atomic energy exploitation, and underwater exploration. As can readily be appreciated by those familiar with the design and fabrication of remote manipulators, it is common practice to provide segmented manipulator arms with a series of joints through which angular displacement is afforded.

One of the more commonly utilized manipulators is one in which a plurality of cables or tapes is utilized in transmitting power from a remote source to pivotally supported segments of a manipulator arm, whereby pivotal motion of each of the segments selectively is achieved. This type of manipulator is classified as being of the so-called "tendon design."

Another type of manipulator sometimes employed is the "hydraulic manipulator" which includes a plurality of independently operable hydraulic actuators coupled with selected pivotally supported segments of a segmented manipulator arm. An activation of these actuators serves to impart angular displacement of the segments.

Of course, permanent magnet D.C. motors and reduction units often are employed for imparting pivotal motion to the segments of the arms of manipulators.

As a practical matter, it has been found that the utility of manipulators classified as being of the tendon design is severely limited due to the restricted rotation through which the segments can, in operation, be displaced, as well as the complexity of the design, joint looseness, and the attendant general overall low degree of reliability. Consequently, use of manipulators of this type, for practical purposes, is no longer desirable, particularly in fields of technology where flexibility and reliability are of utmost concern.

Similarly, in aerospace fields, the use of manipulators which employ hydraulic actuators has been substantially impaired due to the fact that the actuators often experience leakage which can seriously degrade or even initiate termination of a satellite's mission.

Even though manipulators provided with permanent magnet D.C. motors and reduction units have met with a varying degree of success, it can readily be appreciated that such manipulators are not particularly suitable for employment in environments wherein uses of electrical circuitry are not feasible or are, for various reasons, found to be undesirable.

It is therefore the general purpose of the instant invention to provide an improved remotely operable, articulated manipulator having segments to which power is transmitted mechanically without experiencing cross-coupling of motion between the various joints provided therefor.

OBJECTS AND SUMMARY OF THE INVENTION

It is an object of the instant invention to provide an improved remotely operable, articulated manipulator.

It is another object to provide a remotely operable, articulated manipulator particularly suited for miniaturization.

It is another object to provide an improved lightweight, highly reliable remotely operable, articulated manipulator.

It is another object to provide an improved remotely operable, articulated manipulator including a mechanical power train.

It is another object to provide a remotely operable, articulated manipulator including an arm characterized by a series of segments connected through joints provided for accommodating continuous rotation of the segments.

It is another object to provide an improved remotely operable, articulated manipulator particularly adapted for use in negative pressure environments of celestial space and the positive pressures of marine environments.

These and other objects and advantages are achieved through the use of a remotely operable, articulated manipulator which includes a plurality of serially connected drive shafts having a grasping device affixed at the distal end of the ultimate drive shaft of the plurality, a drive train within which is included a plurality of joints for interconnecting the drive shafts in angular relationships, a plurality of drive tubes concentrically related to the drive shafts, also interconnected at the joints, for pivotally displacing the drive shafts, actuator sleeves supporting the drive shafts for rotation, and a power transmission train including a differential through which power in transmitted to the drive shafts and drive tubes for imparting selected angular displacement to selected drive shafts, whereby selective reorientation of the grasping device is achieved, in a manner as will hereinafter become more readily apparent by reference to the following description and claims in light of the accompanying drawings.

BRIEF DESCRIPTION OF THE DRAWINGS

FIG. 1 is a perspective view of a manipulator comprising a first embodiment of the instant invention having a segmented arm.

FIG. 2 is a fragmented, vertically sectioned view of the manipulator shown in FIG. 1, but rotated illustrating segments of the arm shown in FIG. 1.

FIG. 3 is a partially sectioned end view, illustrating a coupling of power sources with the manipulator.

FIG. 4 is a fragmented, elevational view, illustrating a differential through which power is transmitted from the sources shown in FIG. 3 to segments of the arm illustrated in FIG. 2.

FIG. 5 is a perspective view of a further embodiment of the manipulator shown in FIG. 1.

FIG. 6 is a fragmented, cross-sectional view, illustrating a joint through which power is delivered between contiguous segments of the arm of the manipulator illustrated in FIG. 5.

DESCRIPTION OF THE PREFERRED EMBODIMENT

Referring now, with more particularity, to the drawings wherein like reference characters designate like or corresponding parts throughout the several views, there is shown in FIG. 1 a manipulator, generally designated 10, which comprises one embodiment of the instant invention.

As shown in the drawings, the manipulator 10 is supported by a vertically oriented pedestal 12 suitably secured to a given base, not shown. A vertically projected axis of rotation is provided for the manipulator 10 by a bearing-supported coupling 14 suitably mounted for rotation on the pedestal 12 and disposed in supporting relation with the manipulator 10. As a practical matter, a reversible, D.C. drive motor 16 having a driven worm 18 projected therefrom and meshed with a worm gear 20, mounted in circumscribing relation with the coupling 14, is provided for driving the manipulator in rotation about the aforementioned axis.

Affixed to the uppermost end of the coupling 14 is a trunnion 22 which serves to receive in supporting relationship a housing 24 provided for the base portion, generally designated 26, of the manipulator 10. As a practical matter, the housing 24 is provided with a co-axially aligned pair of bearing pins 28 extended therefrom and received in journal bearings, not designated, provided for the trunnion 22. It will, therefore, be appreciated that the base of the manipulator 10 also is supported for rotation about a horizontal axis of rotation, normally related to the vertically oriented axis of rotation.

A reversible D.C. drive motor 30 preferably is mounted on the housing 24 and serves to impart rotation to the manipulator about the aforementioned second axis. As a practical matter, the motor 30 preferably is connected in driving relation with a worm 32 meshed with a worm gear 33, also mounted on the trunnion, whereby pivotal motion of the manipulator about the horizontal axis is achieved in response to a driven rotation of the worm.

From the housing 24, there is extended an articulated manipulator arm, generally designated 34, having a distal end at which there is provided a suitable grasping device, generally designated 36. As illustrated in the drawings, the grasping device 36 includes a pair of jaws, not designated, suitably configured for receiving bars, hooks, clamps and devices of a similar nature. However, it is to be understood that the particular configuration of the grasping device is a matter of convenience, and dictated by the prevailing use environment. Moreover, the grasping device 36 is actuated through a use of any suitable linkage, signal transmission circuits, and power sources connected therewith. Since the grasping device 36 forms no specific part of the instant invention, a more detailed description thereof is omitted in the interest of brevity.

As shown, however, the grasping device 36 is rigidly affixed to the distal end of an articulated power train. This power train includes a plurality of drive shafts including a first drive shaft 38, a second drive shaft 40, orthogonally related to the drive shaft 38, an ultimate drive shaft, designated 42, orthogonally related to the drive shaft 40. It is to be understood that preferably the grasping device 36 is affixed to and projected axially from the ultimate drive shaft 42 so that rotation imparted to the drive shaft 42 serves to impart similar rotation to the grasping device.

The drive shaft 42, in practice, is supported for rotation about its longitudinal axis by a segmented sleeve 44 having angularly related segments 46 and 48. As shown, the segment 46 of the sleeve 44 includes a horizontally extended bore, not designated, having seated therein a bearing sleeve 50 through which the drive shaft 42 axially is extended. The sleeve segment 48, on the other hand, includes a vertically oriented bore 52 through which is extended a drive tube 54 to which the segmented sleeve 44 is rigidly affixed.

As a practical matter, the drive tube 54 projects from a shell defining a housing, designated 56, within which an annular bearing 58 is provided in concentric supporting relationship with the drive tube. It should, therefore, be apparent that the segmented sleeve 44 is suspended from the housing 56 and supported thereby for rotary motion about an axis coincident with the longitudinal axis of symmetry for the drive shaft 40, whereby a joint for the arm 10 is thus defined.

The drive shaft is seated within a suitable bearing of a tubular configuration, designated 60, concentrically seated within the drive tube 54, whereby relative angular motion between the drive shaft 40 and the drive tube 54 is facilitated.

As shown, the angularly related drive shafts 40 and 42 are interconnected through a meshed pair of bevel gears, designated 61, suitably secured to the adjacent ends thereof. The drive shaft 38 is concentrically received by a drive tube 62 connected with the drive shaft 40 through a meshed pair of bevel gears 63. The drive tube 62 is, in turn, received in concentric relation with a casing 64. The casing 64 preferably is of a tubular configuration and extends from the base 26 of the manipulator. A plurality of suitably configured bearing sleeves 66 are seated within the casing and support the drive tube 62 for rotary motion about an axis coincident with its longitudinal axis of symmetry.

As a practical matter, the drive tube 62 also is provided with a plurality of internal bearing sleeves 68 which support the drive shaft 38 for rotation about an axis coincident with its longitudinal axis of symmetry. It should, therefore, be appreciated that the drive shaft 38 and the drive tube 62 are concentrically related and that each is supported for independent angular displacement about a common axis of rotation.

The housing 56 is rigidly affixed to the distal end of the casing 64. Hence, it can be appreciated that the drive shaft 40 is supported in a fixed orthogonal relationship with the drive shaft 38 and that rotary motion imparted to the drive shaft 38, about an axis coincident with its longitudinal axis, is transmitted to the drive shaft 40. Of course, such motion is then transmitted through the meshed pair of bevel gears 61, to the drive shaft 42, whereby rotation is imparted to the drive shaft 42 about an axis coincident with its longitudinal axis. As a consequence of such motion, rotary motion is imparted to the grasping device 36 about an axis coincident with the longitudinal axis of the drive shaft 42.

The adjacent ends of the drive tubes 54 and 62 are interconnected through a meshed pair of bevel gears 70 which, as a practical matter, are of an annular configuration and are rigidly affixed to the adjacent ends of the drive tubes. Hence, rotary motion imparted to the drive tube 62, about an axis coincident with its longitudinal axis, is transmitted to the drive tube 54 for thereby causing the drive tube 54 to be driven in rotation about an axis coincident with its longitudinal axis of symmetry. Since the sleeve 44 is rigidly affixed to the drive tube 54, the sleeve responsively rotates. Such rotation, of course, causes the distal end of the grasping device 36 to describe an arc about an axis coincident to the longitudinal axis of the drive shaft 40.

It should, at this point, be appreciated that the grasping device 36 is supported for rotary motion about a pair of normally related axes, one of which, as a practical matter, constitutes a projection of the longitudinal axis of the drive shaft 42.

As best illustrated in FIG. 2, the base end of the casing 64 includes a shell 72, of a bell-shaped configuration, having mated therewith a cover plate 74. The plate 74 is rigidly connected with the casing 64 by an annular array of bolts 76 extended therethrough. Of course, the mated shell 72 and cover plate 74 collectively define the housing 24. The housing 24 houses a differential, generally designated 80, through which rotary motion is selectively transmitted to the drive shaft 38 and drive tube 62.

A reversible drive motor, designated 82, is connected to the drive shaft 38, through the differential 80, while a reversible drive motor 84 is connected to the drive tube 62 through the differential.

The drive motor 82 is mounted on the housing 24 and includes a worm 86 projected axially into the housing 24 and mated with a worm gear 88. The worm gear 88, in turn, is suitably affixed to one end of an input stub shaft 90 supported for rotation by a rotatable bracket 92. The bracket 92 is supported by an idler shaft 94 on which is also supported a pair of freely rotatable bevel gears 96.

The bracket 92 includes a bore, not designated, within which is seated a bearing sleeve 98 provided for receiving in concentric relationship the stub shaft 90, whereby angular displacement of the shaft 90, relative to the bracket 92, is accommodated.

At the opposite end of the stub shaft 90 there is affixed a bevel gear 100 which is, in turn, simultaneously meshed with a pair of freely rotatable bevel gears 102 mounted on the idler shaft 94. The bevel gears 102 also are simultaneously enmeshed with a bevel gear 104 rigidly affixed to the drive shaft 38. It will, therefore, be appreciated that as the worm gear 88 is driven in rotation, by the drive motor 84 acting through the worm 86, and the idler shaft 94 is restrained against angular displacement about an axis normally related to its longitudinal axis, a driving torque is transmitted from the bevel gear 100, through the pair of bevel gears 102, to bevel gear 104, whereupon rotary motion responsively is imparted to the grasping device 36 by the drive shafts 38, 40 and 42.

It is important here to note that the bevel gears 96 are interposed in an enmeshed relationship with a pair of annular crown gears, designated 106 and 108. The crown gear 106 projects from a support plate 110, the periphery of which is interposed between and mated with the shell 72 and cover plate 74. Thus, the crown gear 106 is rigidly supported against angular displacement. The crown gear 108, on the other hand, projects from a flared end portion 112 provided for the drive tube 62. Thus, the bracket 92 is supported for angular displacement about an axis coincident with the longitudinal axis of symmetry of the drive shaft 38.

In order to connect the drive motor 84 with the differential 80, a worm gear 116, meshed with a worm 118, is affixed to the bracket 92. The worm gear 116 is coaxially aligned with the worm gear 88 and is rigidly affixed to the bracket while the worm 118 is connected in a driven relationship with the drive motor 84.

When the bracket 92 is driven in rotation, in response to torque applied to the worm gear 116, by the worm 118, and the shaft 90 is fixed against rotation, rotary motion responsively is imparted through the crown gear 108, and, consequently, to the drive tube 62. Moreover, as a consequence of the rotation of the drive tube 62, rotary motion is imparted to the drive tube 54 for thus causing the grasping device 36 to rotate about an axis coincident with the longitudinal axis of symmetry of the drive shaft 40. It should also be noted that in this instance both the plurality of drive shafts 38 through 42 are driven in rotation simultaneously with the drive tubes, however, the drive tubes and drive shafts do not rotate relative to each other, thus the orientation of the grasping device 36 relative to the sleeve 44 remains substantially unaltered.

It will, of course, be appreciated that, where so desired, the drive shafts 38, 40 and 42 are of a tubular configuration for facilitating an insertion of control cables, electrical signal conductors and similar control components, whereby the operation of the grasping device 36 is facilitated as rotation is imparted thereto.

FURTHER EMBODIMENT

Figures 5, 6:
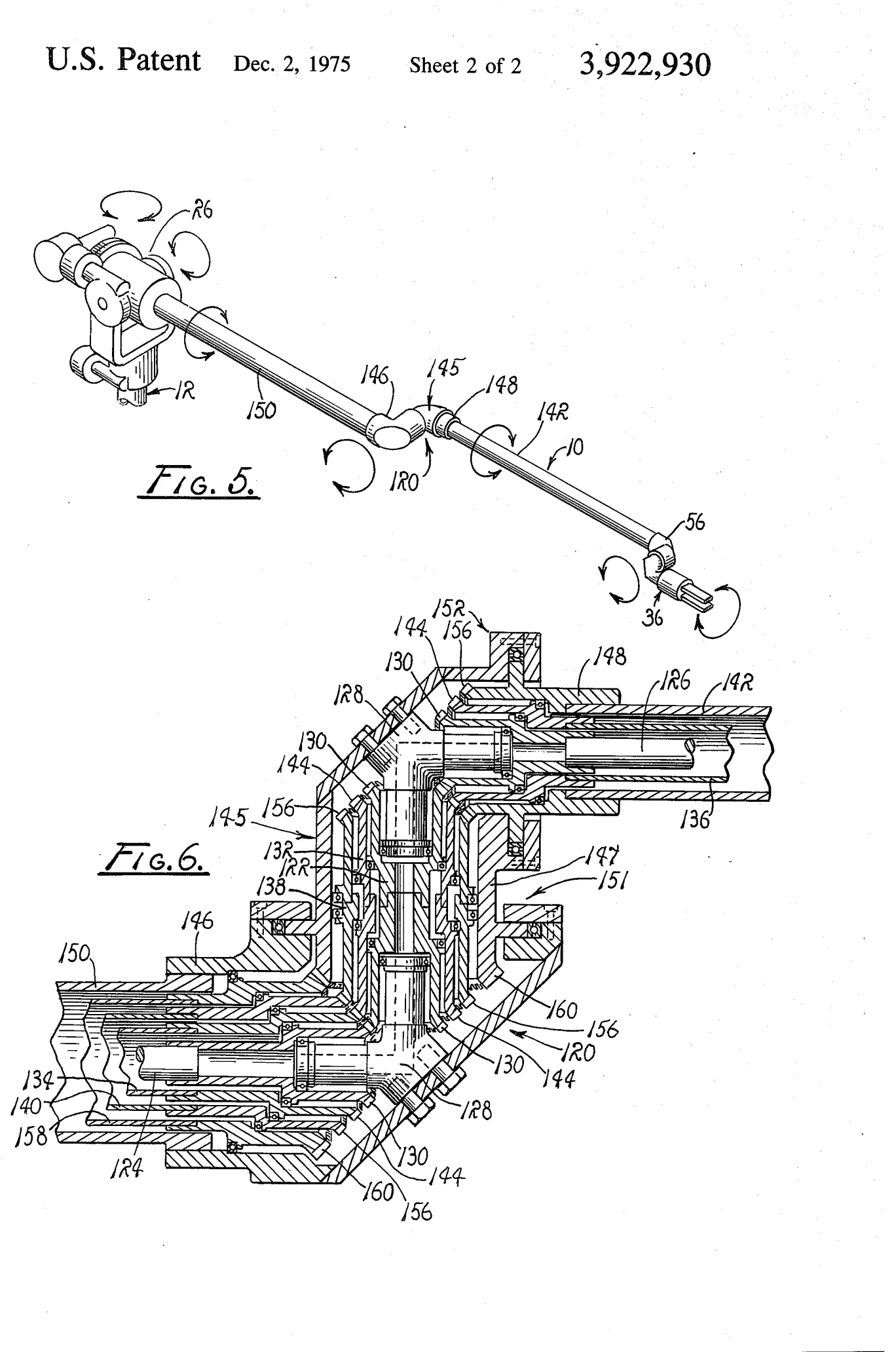

The further embodiment of the invention, as illustrated in FIGS. 5 and 6 of the drawings, includes basic structural components similar in design and function to the components described in connection with the description of the embodiment illustrated in FIGS. 1 through 4. Therefore, similar components are similarly designated.

As a practical matter, the manipulator 10 is, where so desired, provided with an additional joint 120, as illustrated in FIGS. 5 and 6. The joint 120 includes a drive shaft segment, which, for the sake of convenience, is designated drive shaft 122. This shaft is disposed in an interposed relationship between the opposite end portions of the drive shaft 38 which, also for the sake of convenience, are designated drive shafts 124 and 126. The opposite ends of the drive shaft 122 are supported by a suitable internal bearing structure, designated 128. This structure also serves to support the adjacent ends of the drive shafts 124 and 126. The drive shaft 122 is connected with the drive shafts 124 and 126 through enmeshed bevel gears 130 provided at each of its opposite ends. Concentrically related to the drive shaft 122, there is a drive tube 132. This drive tube is supported in an interposed relationship between the opposite end portions of the drive tube 62, designated, also for the sake of convenience, drive tube portions 134 and 136.

A casing segment 138 is interposed between the opposite end portions of the casing 64, designated casing segments 140 and 142 and is connected therewith through pairs of enmeshed bevel gears 144.

In view of the foregoing, it should readily be apparent that the drive shaft 126 is driven in rotation by the drive shaft 122, to which rotation is imparted by the drive shaft 124. Similarly, the drive tube portion 136 is driven in rotation by the drive tube 132, to which rotation is imparted by the drive tube portion 134. Similarly, in this embodiment of the invention, the casing segment 142 is driven in rotation by the casing segment 138 which, in turn, is driven by the casing segment 140.

It is important to note that the joint 120 also includes a casing sleeve, designated 145, having normally related segments 146, 147 and 148. The segment 146 is rigidly connected with an alternate casing 150 extended from the base 26 and is rotatably united with the segment 147 of the casing sleeve 145 through a suitable bearing coupling, generally designated 151. The segment 148 is, in turn, rigidly affixed to the casing segment 142 and a bearing coupling, generally designated 152, is provided for rotatably uniting the segment 148 with the segment 147. Hence, rotation between the segments 146, 147 and 148 of the casing sleeve 145 is facilitated.

In order to impart rotation to the casing segment 142 about its own axis, rotation is imparted to the casing segment 140 and thence to segment 138 via the enmeshed gears 156. In order to impart rotation to the casing segment 142 about an axis normally related to its longitudinal axis a drive tube 158 is connected with the segment 147 of the sleeve 145 through a pair of meshed bevel gears 160. Hence, rotary motion imparted to the drive tube 158 is transmitted to the casing segment 142 via the enmeshed bevel gears 160.

It is to be understood, of course, that the drive tube 132, drive tube portions 134 and 136, and the casing segments 138, 140 and 142 are all supported for rotation about their respective longitudinal axes by suitable bearings, shown but not designated. Moreover, it is to be understood that, while not shown, the base of the manipulator is provided with suitable drive means coupled with the drive tube 158 and casing segment 140 as well as with the drive tube portion 134 and drive shaft 124, for imparting rotation thereto. Since such drive means are varied as desired, a detailed description of the specific drive means thus employed is omitted in the interest of brevity. However, as can readily be appreciated, concentrically related ring gears connected therewith through pairs of freely rotatable pinion gears serve quite satisfactorily for this purpose.

OPERATION

It is believed that in view of the foregoing description, the operation of the device will readily be understood and it will be briefly reviewed at this point.

With the remotely operable, articulated manipulator assembled in the manner described in connection with the description of the embodiment illustrated in FIGS. 1 through 4, rotation of the grasping device 36 about an axis coincident with the longitudinal axis of the drive shaft 42 is achieved simply by supporting the rotatable bracket 92 against rotation and driving the worm gear 88 in a selected direction of rotation, through an energization of the reversible D.C. drive motor 82. This results in rotary motion being transmitted to the grasping device through the drive shafts 38, 40 and 42 via the shaft 90, and bevel gears 100, 102 and 104 of the differential 80.

In the event it becomes desirable to rotate the grasping device 36 about an axis which intersects a projection of the longitudinal axis of the drive shaft 42, the worm gear 88 is supported against rotation while rotation in a selected direction is imparted to the worm gear 116, by the reversible D.C. drive motor 84 acting through the worm 118. Rotation of the worm gear 116 causes the bracket 92 to rotate about an axis coincident with the longitudinal axis of the drive shaft 38, whereupon the drive tube 62 is responsively driven, via the gears 96, 106 and 108 of the differential 80, in rotation for imparting responsive rotation to the drive tube 54. This rotation causes the grasping device 36 to scribe an imaginary arc about the longitudinal axis of the drive shaft 40.

Where the joint 120 is included in the manipulator additional freedoms of rotation are afforded for the grasping device 36. For example, by imparting rotation to the casing segment 140, angular displacement is imparted to the casing segment 142, about its own axis, for causing the sleeve 44 to rotate about an axis coincident with the longitudinal axis of the drive shaft 126, interposed within the drive shaft 38. Similarly, by imparting rotation to the drive tube 158, rotation is imparted to the sleeve segment 148 for thus causing the grasping device 36 to be angularly displaced, with a sweeping motion about the longitudinal axis of the drive shaft 122. Of course, additional freedoms of motion may be included.

In view of the foregoing, it should readily be apparent that the manipulator of the instant invention provides a practical solution to the problems encountered heretofore in the design and fabrication of remotely operable, articulated manipulators.

Although the invention has been herein shown and described in what are conceived to be the most practical and preferred embodiments, it is recognized that departures may be made within the scope of the invention, which is not to be limited to the illustrative details disclosed.

I claim:

1. In a remotely operable, articulated manipulator including a plurality of serially connected drive shafts and a grasping device mounted at the distal end of the ultimate drive shaft of said plurality, the improvement comprising:
   drive means for selectively imparting to said grasping device angular displacement about a pair of normally related axes, one of which comprises a projection of the longitudinal axis of said ultimate drive shaft.

2. The improvement of claim 1 wherein said drive means includes:
   A. a rotatable sleeve including a pair of normally related segments for supporting the ultimate drive shaft in an orthogonal relationship with the penultimate drive shaft of said plurality of drive shafts; and
   B. means including a meshed pair of bevel gears for connecting the ultimate drive shaft in a driven relationship with the penultimate drive shaft.

3. The improvement of claim 2 further comprising:
   means for imparting to said rotatable sleeve angular displacement about an axis of rotation coincident with the longitudinal axis of said penultimate drive shaft.

4. The improvement of claim 3 wherein said drive means includes:
   A. a further drive shaft angularly related to the penultimate drive shaft; and
   B. means including a meshed pair of bevel gears for connecting said penultimate drive shaft in a driven relationship with said further drive shaft.

5. The improvement of claim 4 wherein said means for imparting angular displacement to said rotatable sleeve includes:
   A. a drive tube concentrically related to said further drive shaft; and
   B. a meshed pair of bevel gears connecting said rotatable sleeve in a driven relationship with said drive tube.

6. The improvement of claim 5 wherein said drive means further includes differential drive means comprising a first gear train connected with said further drive shaft and a second gear train connected with said drive tube, and means for selectively imparting angular motion to said first and second gear trains.

7. The improvement of claim 6 wherein said further drive shaft comprises a segmented drive shaft including:
   A. a first shaft segment;
   B. a second shaft segment angularly related to said first shaft segment;
   C. a third shaft segment angularly related to second shaft segment; and
   D. means including a first meshed pair of bevel gears for connecting said second segment in a driven relationship with said first shaft segment, and a second meshed pair of bevel gears for connecting said second shaft segment in a driving relationship with said third shaft segment.

8. The improvement of claim 7 wherein said drive tube is a segmented drive tube including:
   A. a first tube segment;
   B. a second tube segment angularly related to said first tube segment;
   C. a third tube segment angularly related to said second tube segment; and
   D. means including a first meshed pair of bevel gears for connecting said second tube segment in a driven relationship with said first shaft segment, and a second meshed pair of bevel gears for connecting said second tube segment in a driving relationship with said third tube segment.

* * * * *